United States Patent [19]
Paufve

[11] 3,826,864
[45] July 30, 1974

[54] SPECIAL EFFECT GENERATOR FOR A SIMULATOR VISUAL SYSTEM

[75] Inventor: Eldred H. Paufve, Susquehanna, Pa.

[73] Assignee: The Singer Company, Binghamton, N.Y.

[22] Filed: Apr. 13, 1973

[21] Appl. No.: 351,086

[52] U.S. Cl............ 178/6.8, 35/12 N, 178/DIG. 35
[51] Int. Cl.......................... G09b 9/08, H04n 7/18
[58] Field of Search ....... 35/12 N; 178/6.8, DIG. 35

[56] References Cited
UNITED STATES PATENTS

| | | | |
|---|---|---|---|
| 3,422,207 | 1/1969 | Flower et al.................... | 35/12 N |
| 3,515,802 | 6/1970 | Wise................................. | 35/12 N |
| 3,605,083 | 9/1971 | Kramer............................ | 178/DIG. 35 |

Primary Examiner—Howard W. Britton
Attorney, Agent, or Firm—James C. Kesterson; Andrew L. Bain

[57] ABSTRACT

A system for generating sky, horizon scenes and scenes simulating low visibility in a flight simulator visual system using a television display is shown. Aircraft attitude information is used in a horizon generator to locate the horizon on a line-to-line basis. The information from the horizon generator is modified by functions of visibility range, altitude, time of day and location above or below clouds to develop the proper scenes, such as white for sky below clouds, white for clouds, the blue for sky above clouds and to switch between these synthetically generated scenes and a terrain scene provided by a camera model system or other image generator.

11 Claims, 9 Drawing Figures

3,826,864

SPECIAL EFFECT GENERATOR FOR A SIMULATOR VISUAL SYSTEM

BACKGROUND OF THE INVENTION

This invention relates to simulation in general and more particularly to an improved system for generating sky, horizon, and limited visibility scenes in a simulator television visual display system.

One of the problems in a visual system wherein a terrain model is used to develop an image to be displayed to the trainee on a television display is in providing for sky and horizon. The model is of limited size and cannot extend to the horizon. Various methods have been used to solve this problem including painted mountain and sky scenes around the edges of the model. Others have used electronic means in some ways similar to the present invention. None of these have been completely satisfactory.

Another need of not only camera model systems but all visual systems is the ability to simulate limited visibility. This has also been done in many ways including fog films, neutral density filters, and electronic means. Again each system has had drawbacks and no previous system has effectively combined sky and horizon generation with the generation of limited visibility functions.

SUMMARY OF THE INVENTION

The present invention fills the above needs by first generating a horizon function on a line-by-line basis from simulateed aircraft attitude and altitude data. This function is modified to take into account the visibility range, horizon depression due to altitude increase, and the relationship between altitude and visibility range and then developed into a function which can be used in switching from sky to terrain when below clouds or sky to clouds when above the clouds. This function is used in gated video amplifiers to cause proper switching. The display is in color and two sets of amplifiers each amplifier having two inputs are provided each set containing an amplifier for each of the three colors. The first set will have as first inputs the terrain video information from the camera model probe or other image generator. Its second inputs will be signals balanced to provide a white at the display. The former is used for foreground scenes below the clouds and the latter to present a foreground cloud scene when above the clouds.

The outputs of the first set provide one input of the second set. The other input is also a balanced set of signals to result in a white display. In addition it has a provision for adding blue to this white for above cloud sky scenes. At the beginning of each scan when sky is being scanned the second set of signals are gated to the display. When the horizon is reached the function described above will cause the amplifier to gradually switch over to the first set to provide the foreground scenes with a smooth transition. Logic inputs are provided to control intensity as a function of time of day and to switch between above, in, and below cloud states.

PREFERRED EMBODIMENT

Figure 1:
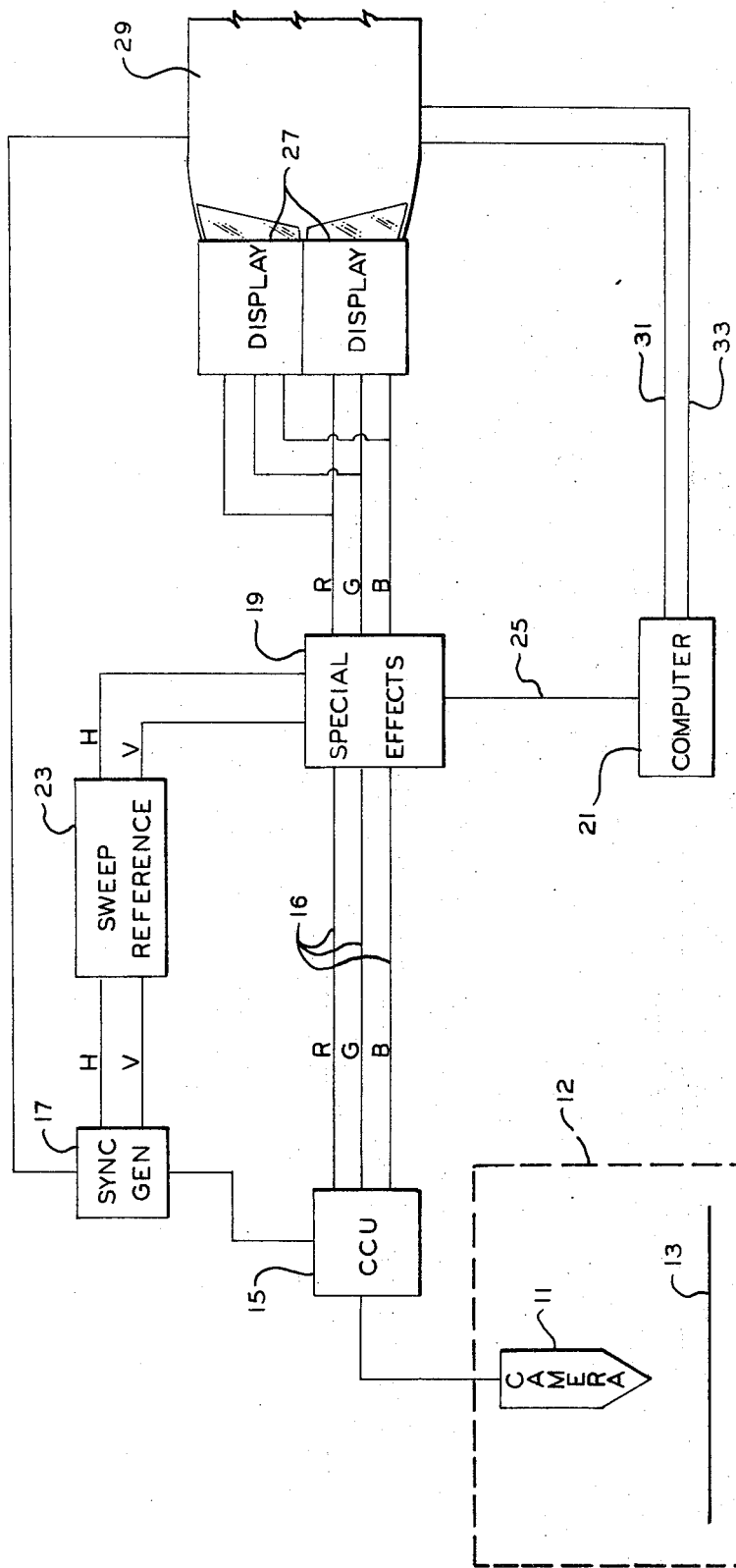
FIG. 1 is an overall block diagram of a visual system using the preferred embodiment of the present invention.

The basic arrangement of the overall camera model system is shown in FIG. 1. A color television camera and probe 11 view a terrain model 13 forming an image generator 12. The camera is controlled by a remote camera control unit 15 from which are available on lines 16 the three color signals (red, green and blue). Sync for the whole system is provided by a sync generator 17. The color signals on lines 16 are provided to a special effects generator 19 which also has inputs from a computer 21 and a sweep reference generator 23. Computer 21 will be the flight simulator computer in which are stored the equations of motion of the simulator with which the visual system is used and will provide outputs on line 25 relating to the position and attitude of the simulated aircraft to be used in a manner to be described below. It should be noted that the elements of image generator 12 can also be a television camera 11 viewing a motion picture film 13. Camera 11 instead may be a flying spot scanner scanning a film. In general the present system may be used with any visual system using television imagry.

Sweep reference generator 23 is a highly accurate and linear sweep generator which develops horizontal and vertical sweep waveforms to be used in special effects generator 19 from the horizontal and vertical drive signals provided by sync generator 17 and may be constructed using techniques well known in the television art. The outputs of special effects generator 19 are provided to displays 27 which are arranged for viewing by trainees in a simulated aircraft cockpit 29. In the cockpit are simulated controls which provide outputs to computer 21 on line 31 for use therein in computing outputs to be provided on line 25 as described above and on line 33 to instruments in cockpit 27 in a manner well known in the art.

The heart of the present invention is the special effects generator 19 which will be described in detail below. Before beginning this description it will be helpful to consider the types of scenes which are required to be presented to a pilot.

Under good visibility conditions, a terrain scene, generated by camera 11 and model 13, must appear in the foreground with a horizon and then sky or clouds. As visibility decreases portions of the terrain must be obscured to simulate this limited visibility. As the simulated aircraft climbs it may enter clouds, then come out on top of clouds and still climb further. When in clouds a white scene should be present. Above clouds, white in the foreground simulating clouds, with blue sky of increasing intensity as altitude increases, is required.

Special effects generator 19 provides all this. That is, any scenes other than the terrain scene developed by camera 11, are synthetically generated by special effects generator 19.

Figure 2:
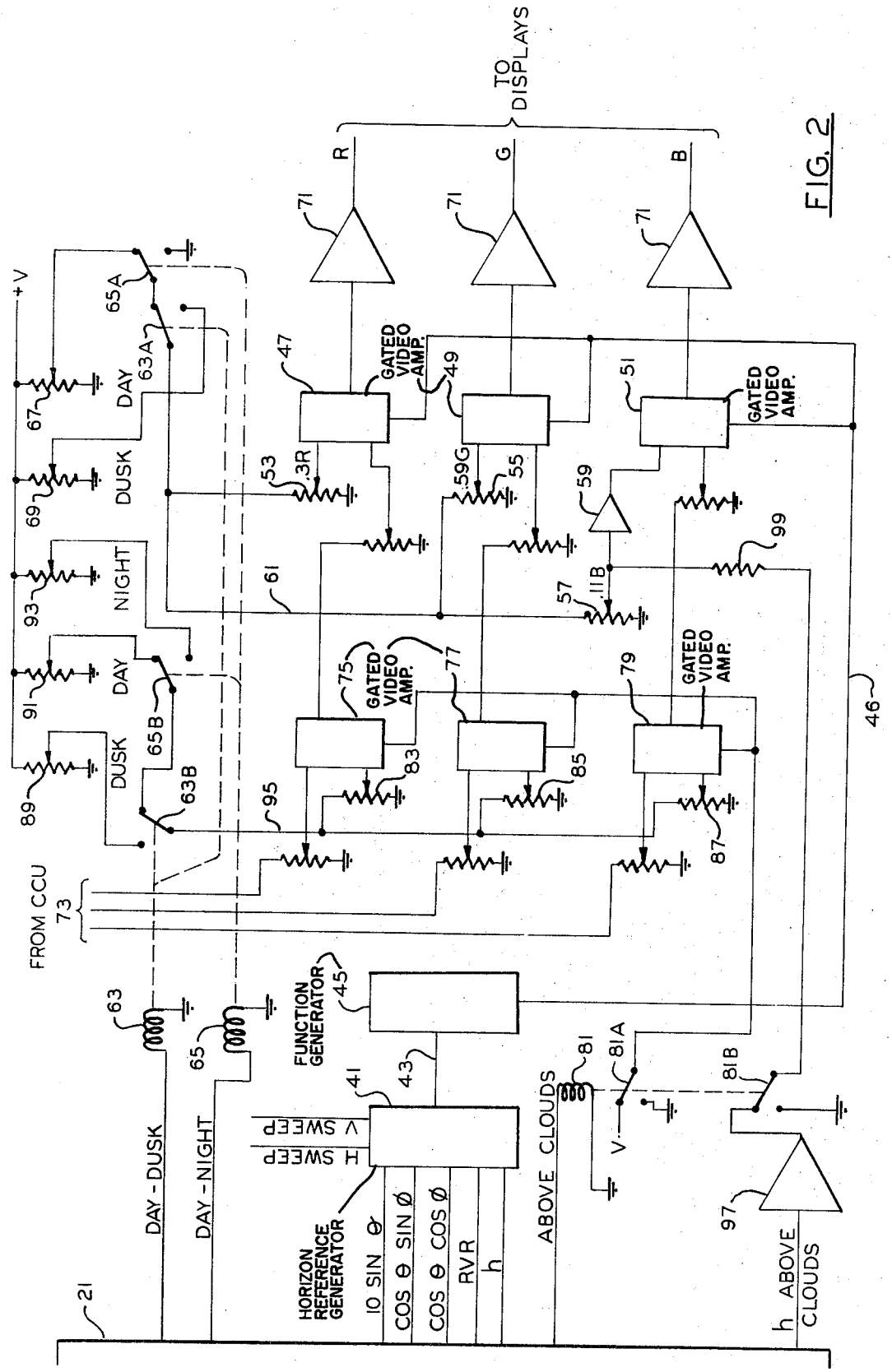
FIG. 2 is a block circuit diagram of the output gating portion of the preferred embodiment.

The basic block diagram of special effects generator 19 is shown in FIG. 2. A block 41 obtains inputs of 10 sine $\theta$, cos $\theta$ sin $\phi$, cos $\theta$ cos $\phi$, RVR and altitude from the computer 21 where:

$\theta$ = the simulated aircraft pitch angle
$\phi$ = the simulated aircraft roll angle
RVR = Runway visibility range
$h$ = Altitude The reference horizontal and vertical sweeps are also used as inputs to develop on line 43 a horizon reference signal on a line-by-line basis. This signal is used in a function generator 45 to develop a gating signal for use in switching between model video and special effects. Blocks 41 and 45 will be described in detail below. As the camera of FIG. 1 scans, it will normally scan the sky area (assuming any exists) first. During this period the output on line 46 from generator 45 will be zero. This is provided as a gating input to three gated video amplifiers 47, 49 and 51. These amplifiers, which may be Motorola MC 1545G amplifiers, have two signal inputs, one signal output and a gate input. With zero volts in on the gate, the upper input as shown on FIG. 2 will be gated to the output. With 2 or more volts, the lower input will be gated to the output. In between, the two input signals will be mixed. Each of the upper inputs is connected to a wiper of a potentiometer. That of amplifier 47, the red amplifier to potentiometer 53, that of amplifier 49, the green amplifier, to potentiometer 55 and that of amplifier 51, the blue amplifier, to potentiometer 57 through a unity gain summing amplifier 59. Each of the potentiometers is grounded on one side and connected to a common voltage on the other. They are adjusted respectively so that potentiometer 53 has an output which is 0.3 of its input, potentiometer 55 has 0.59 of the input and potentiometer 57 has 0.11 of its input. The amplifiers 47, 49 and 51 respectively provide the red, green and blue outputs to the display, through line drivers 71. With the potentiometers set as indicated the resulting color will be white. This is used to represent sky in the display.

However, sky will vary for various times of day. To provide for this variation means are provided to vary the white from bright white for day, to gray for dusk, to black for night. This is done by controlling the input to the potentiometers on line 61. Line 61 is connected to the common contact of a relay pole 63A controlled by relay 63. In the position shown it will be connected through the normally closed contact to the common contact of a relay pole 65A controlled by relay 65 and thence through the normaly closed contact of that relay to the wiper of a potentiometer 67. Potentiometer 67 is adjsuted to give a bright white video output simulating day.

If relay 63 is operated by a command from computer 21 indicating dusk, line 61 will be connected through the normally open contact of 63A to the wiper of potentiometer 69 which is adjusted to provide a gray output. If relay 65 is operated by a computer command line 61 is grounded through the normally open contact of pole 65A resulting in a black output.

Thus, with a zero volt input on line 43, the combined video output after passing through line drivers 71 will be white, gray or black depending on time of day. When the horizon is reached the signal on line 43 will gradually go from 0 to 2 volts as will be described below. This will cause amplifiers 47, 49, and 51 to switch to the terrain video which is provided on lines 73 through three gated amplifiers 75, 77, and 79 to the lower inputs of amplifiers 47, 49, and 51. This will cause a gradual change from white to model image with the horizon hazy. As visibility decreases the function on line 46 will change to obscure more of the model video information, i.e., in effect it will bring the horizon closer.

Amplifiers 75, 77 and 79 provide means to select below or above cloud scenes. When below clouds the terrain video will be switched as described above. But, the simulator may go through the clouds and come out above. When the simulated aircraft comes out of the clouds a signal from computer 21 will activate relay 81 causing its pole 81A to provide a voltage to amplifiers 75, 77 and 79 causing them to switch to their lower inputs.

As were the upper inputs of amplifiers 47, 49, and 51 these are connected to potentiometers 83, 85 and 87 which are set to provide a white output. The input voltage to these potentiometers is provided from a series of potentiometers 89, 91, and 93 which are switched to line 95 by poles 63B and 65B depending on operation of relays 63 and 65. Operation is the same as for poles 63A and 65A except that the night scene need not be completely black with potentiometer 93 able to supply a low voltage for dark gray.

As the aircraft comes out of the clouds amplifiers 47, 49, and 51 under control of the signal on line 43 will be switching from a white sky to a white foreground (from amplifiers 75, 77 and 79) as the horizon is passed. This is proper since the sky will look white at this point. However relay 81 also operated a second contact 81B which causes a portion of a computer signal representing altitude above clouds to be provided through an amplifier 97, pole 81B and resistor 99 to amplifier 59. This causes additional blue to be added to the output, the amount of blue increasing as altitude increases to obtain the desired result of a sky which becomes a deeper blue as altitude increases.

The operation may be summarized as follows:

a. when below clouds, sky is provided from the upper inputs of amplifiers 47, 49 and 51 and the foreground from the lower inputs which are provided from the camera through the upper inputs of amplifiers 75, 77, and 79.

b. when in clouds the control signal on line 46 may be kept at zero so that switches to the ground scene never occurs;

c. above clouds, sky is provided from the upper inputs to amplifiers 47, 49, and 51 with blue added to amplifier 51 as a function of altitude above clouds and the foreground (now clouds) from the lower inputs which now come through amplifiers 75, 77 and 79 from their lower inputs which are adjusted to give a white color; and d. in any mode, time of day and brightness are controlled by relays 63 and 65 which regulate the input voltages to all amplifiers.

Figure 3:
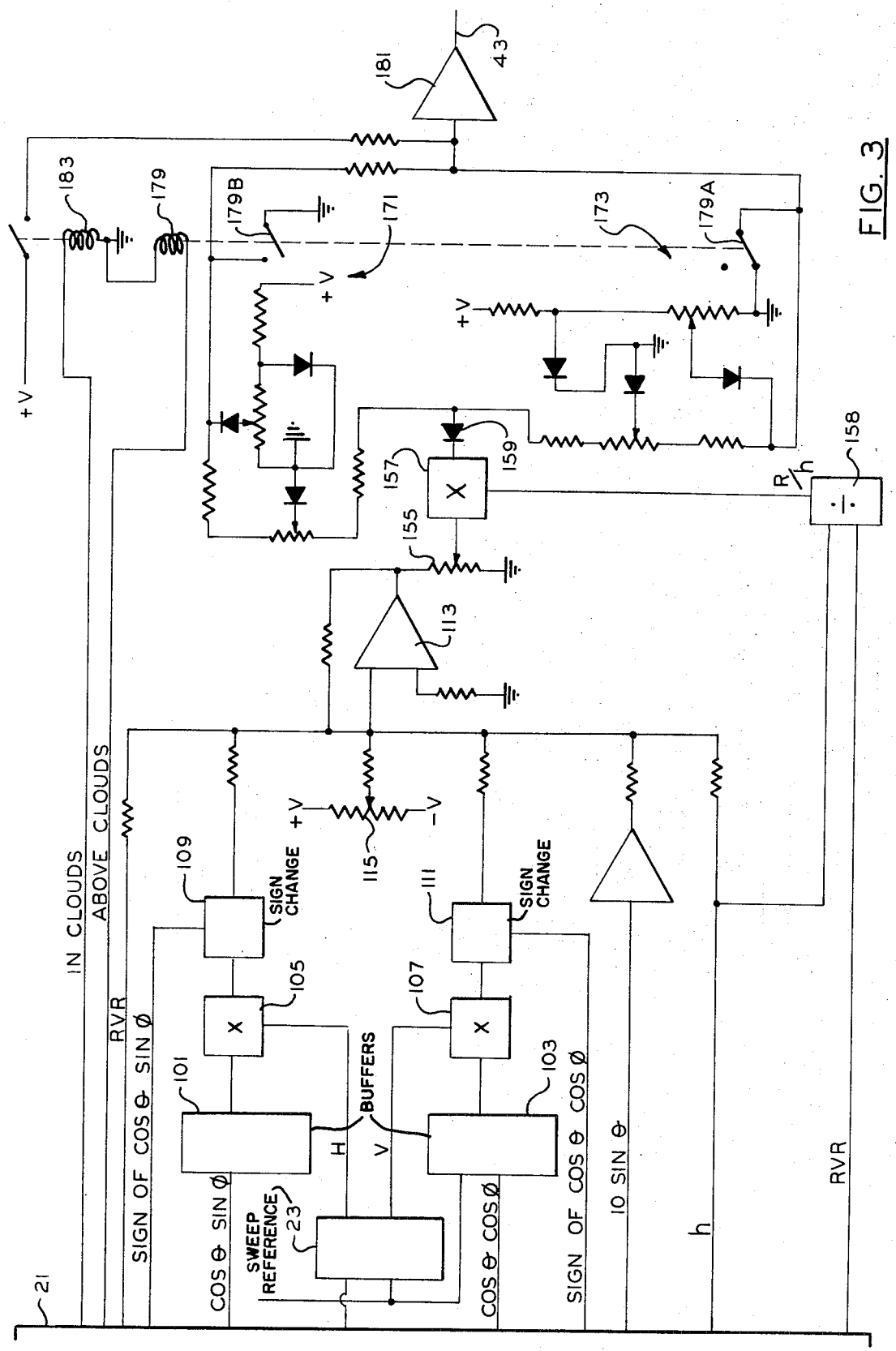
FIG. 3 is a block-circuit diagram of the horizon and function generator portions of the preferred embodiment.

In FIG. 3 there is shown the horizon generator 41 and function generator 43 of FIG. 2 which provide the switching waveforms. Two data buffers 101 and 103 have as respective inputs from computer 21 cos $\theta$ sin $\phi$ and cos $\theta$ cos $\phi$. The outputs from these buffers are provided to multiplying digital to analog converters 105 and 107 where they multiply respectively the horizontal and vertical sweeps from generator 23. The outputs from the multipliers are then provided to sign change circuits 109 and 111 which have as inputs a bit from computer 21 indicating the signs associated with cos $\theta$ sin $\phi$ and cos $\theta$ cos $\phi$. This is a conventional circuit comprising operational amplifiers and electronic switches adapted to invert the signal for a minus sign at the input and to not invert for a plus sign. The outputs of blocks 109 and 111 are summed in amplifier 113 along with a portion of RVR (visibility range) and h (altitude) and 10 sin $\theta$ from computer 21 and a trim voltage from a potentiometer 115. Summing resistors are provided at the amplifier input in conventional fashion to provide required scaling.

It will be recalled that this portion of the circuit is used to locate the horizon. In understanding how this is done, examination of FIGS. 4 and 5 along with FIG. 3 will be helpful. Assume first the case where roll and pitch are both zero. Sin $\theta$ will be zero as will sin $\phi$. Cos $\theta$ and cos $\phi$ will be one. Thus the only inputs to amplifier 113 will be vertical sweep, h, RVR an trim. The vertical waveform 117 is shown on FIG. 4. With h equal to zero and RVR infinite, the trim pot 115 is adjusted so that line 119 representing zero volts is at the horizon 121 as shown on FIG. 5. The upper portion 123 of waveform 117 is used to develop the gating input described in connection with FIG. 2 in a manner to be explained below.

As altitude increases the horizon will dip. Thus the h input is used to provide a DC offset under these conditions. This is illustrated by line 125 on FIG. 5 and a new zero line 127 on FIG. 4. As visibility range, RVR, decreases the point where land is visible moves to the foreground. If this point is defined as the horizon it can be seen that adding an offset for RVR will cause a further dip as illustrated by line 129 on FIG. 5 and zero reference 131 on FIG. 4.

Adding pitch to amplifier 113 via the 10 sin $\theta$ input will similarly shift horizon 121 by shifting the zero point 119. The result of a small roll angle is illustrated by raster 133 of FIG. 5 and waveform 135 of FIG. 4. The horizontal waveform 137 is shown for purposes of simplicity as tracing only four lines for one vertical sweep 117. In actual practice, of course, 250 or more horizontal lines will be traced for each vertical sweep. With a roll angle the cos $\theta$ sin $\phi$ term will no longer be zero and cos $\theta$ cos $\phi$ no longer one. When the vertical waveform 117 is multiplied in block 105 the result will be as shown by waveform 139 and when horizontal waveform 137 is multiplied in block 107 the result will be shown by waveform 141. When these are added in amplifier 113 the final result will be as shown on waveform 135.

The first horizontal scan, as it appears on waveform 135, just barely crosses line 143 the zero line representing the horizon. This corresponds to line 145 on FIG. 5. The next scan crosses at about the middle corresponding to line 147 on FIG. 5. The next, corresponding to line 149, only at the beginning and the last, corresponding to line 151, not at all. It should be noted that the raster 133 illustrates the camera raster where the lower portion, due to inversion through the lens will be sky and the upper portion ground with line 153 representing the horizon.

In effect the multiplication of the horizontal and vertical scans by cos $\theta$ sin $\phi$ and cos $\theta$ cos $\phi$ respectively serves to transform the now tilted scanning axis system back to a horizon axis system and gives the coordinate in that system (the horizon axis system) perpendicular to the horizon.

From the above it will be seen that voltages on waveform 135 below zero, i.e., minus voltages, occur during the scanning of sky and positive voltages during the scanning of terrain. Thus it is at the points where the waveform 135 crosses zero that the gated amplifiers described in connection with FIG. 2 must be switched.

Figure 4:
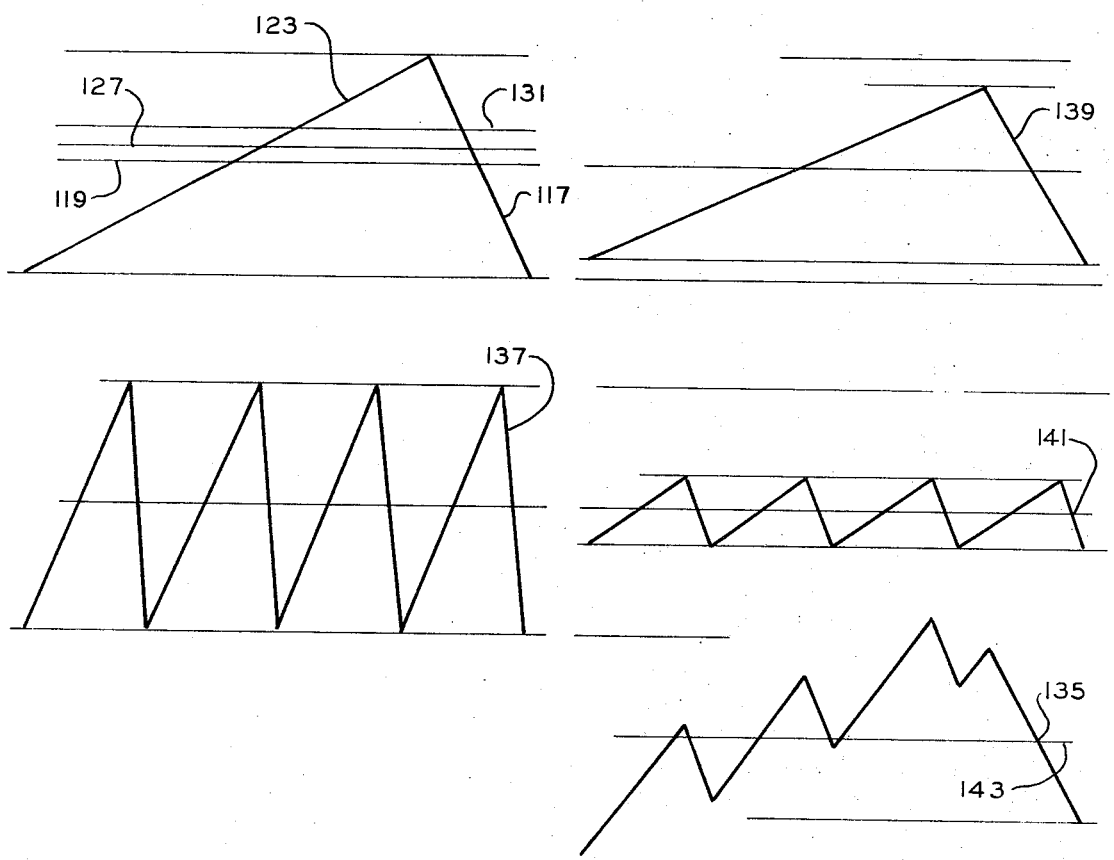
FIG. 4 is a waveform diagram helpful in understanding FIG. 3.
Figure 5:
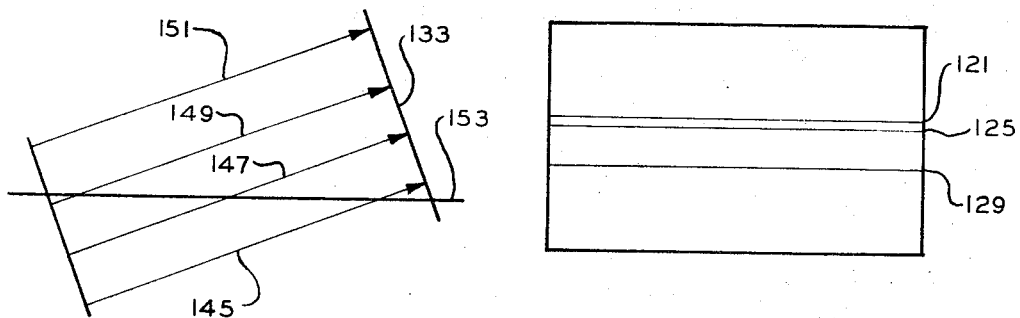
FIG. 5 is a view of a typical raster halpful in understanding FIG. 3.
Figure 6:
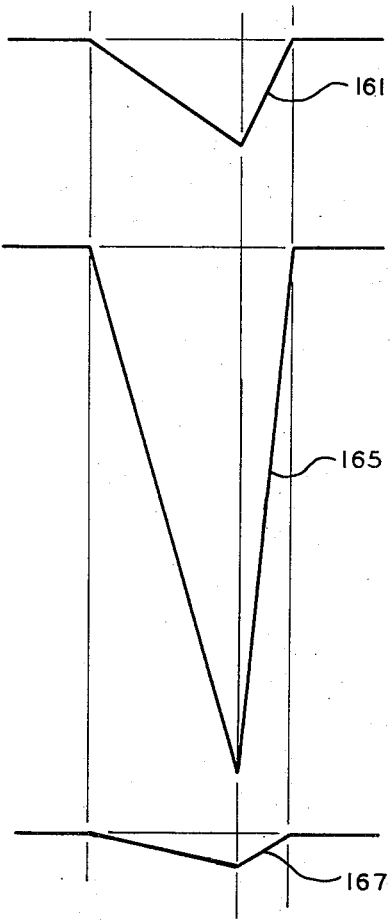
FIG. 6 is a waveform diagram showing the results of multiplication by RVR/h.

Returning to FIG. 3, the output of amplifier 113, i.e., the waveform 135 of FIG. 4 is provided through gain adjust potentiometer 155 to a multiplier 157 where it is multiplied by RVR/h developed in block 159 in a manner to be described below. This is necessary since it will be recognized, that the slant range to points on the ground decreases as altitude increases. Thus as altitude increases less of the ground will be visible. At one mile altitude with a one-mile visibility range, none of the ground would be visible. It has been found that multiplying by RVR/h will approximate the function involved here. Multiplier 157 has a diode on its output to permit only negative outputs. If a zero pitch, zero roll attitude is presumed the input to multiplier 157 will be similar to waveform 117 of FIG. 4. Multiplier 157 inverts so that the output when claimped by diode 159 will look like waveforms 161 on FIG. 6 if multiplied by one (i.e., RVR equals h). Two examples of multiplication by other than one are shown on FIG. 6. Waveform 165 represents a multiplication by 10 (e.g., RVR = 5 and h = ¼) and 167 a multiplication by 14 (e.g., RVR = ½ and h = 2). These waveforms after shaping are used to gate the gated amplifiers described above. As mentioned therein voltages of zero or below cause sky to be switched in, those above 2 volts, foreground and in between a mixture. If for example waveforms 161 peaks at 5 volts it is evident that with waveform 165 a fast switchover from sky to terrain will occur whereas with waveform 167 only a small amount of terrain will be mixed with the white sky causing the whole scene to appear hazy as is proper since in that case RVR is less than the altitude.

The final processing of waveform 135 (now 161, 165 or 167) occurs in the shaping circuits connected to the output of multiplier 157. Two circuits 171 and 173 are provided, the former to give the proper transition from sky to terrain when below clouds and the other the transition from sky to white clouds when above the clouds. These circuits are conventional diode function generators with the diodes and potentiometers shown adjusted to establish the required break points.

Figure 7:
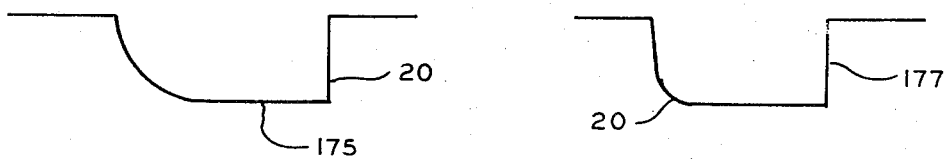
FIG. 7 is a waveform diagram showing the wave shapes produced by the function generator of FIG. 3.

FIG. 7 illustrates the type of output functions provided. Waveform 175 is the shape for the sky-to-terrain transition corresponding to circuit 171 and waveform 177 the sky-to-cloud transition corresponding to circuit 173. The latter is designed to be a sharper transition as is the case in the real world.

Which of the two circuits is to be used is determined by relay 179. In its de-energized condition pole 179A will ground circuit 173 at its output to amplifier 181. Pole 179B will be open and the output of circuit 171 will be provided to amplifier 181. When relay 179 is energized by a command from computer 21, indicating an above cloud condition, pole 179B will close and ground circuit 171 and 179A will open to permit circuit 173 to provide its output to amplifier 181. If in the clouds, relay 183 will be closed causing a positive voltage to be placed on the input to amplifier 181 with a resulting negative output which will prevent any switching from sky to ground thereby resulting in a completely white picture. The waveforms 175 and 177 when selected will be inverted at the output of amplifier 181 to provide the required zero to positive inputs on line 43 to the gated amplifiers of FIG. 2.

Figure 8:
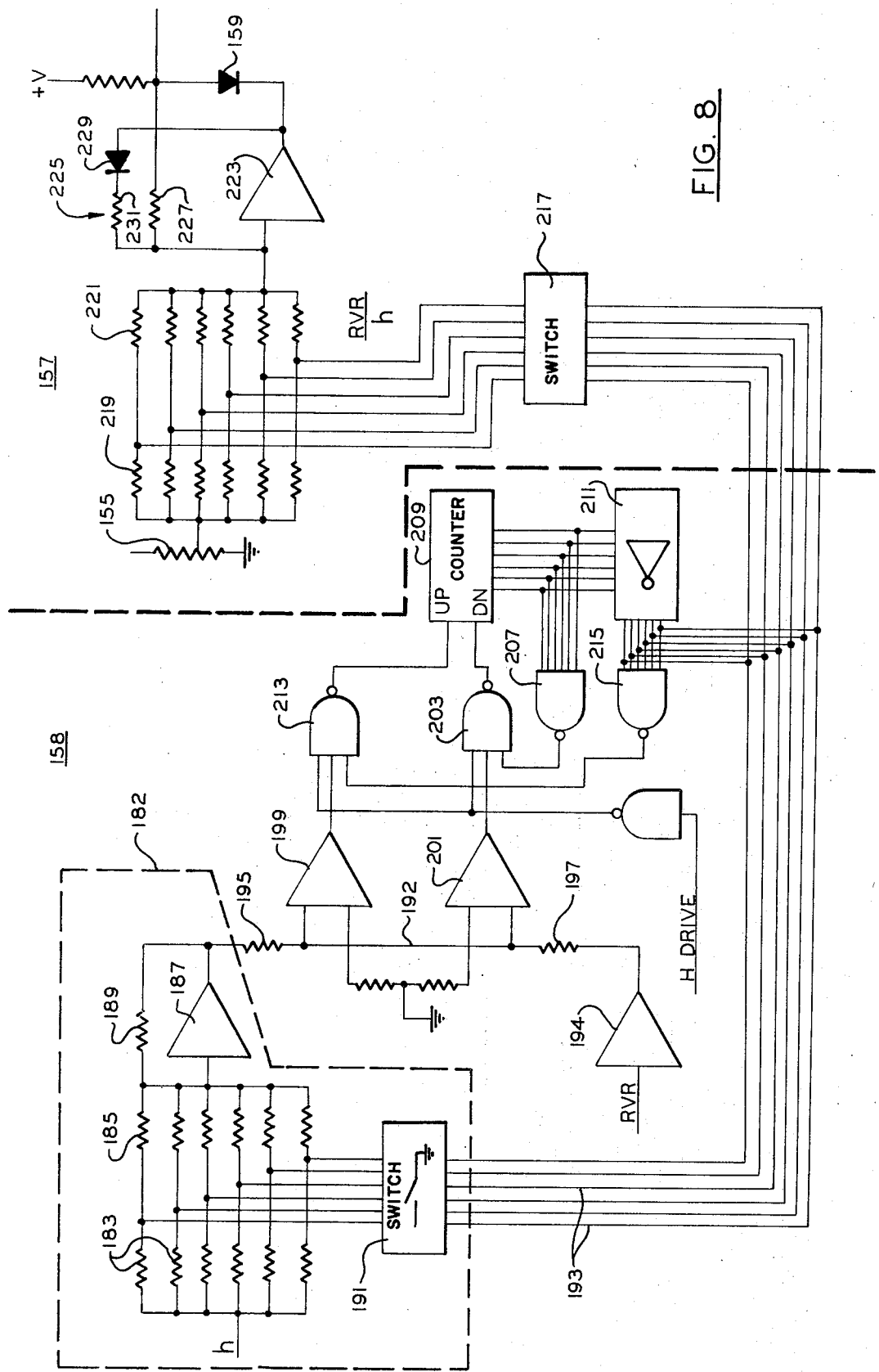
FIG. 8 is a circuit-logic diagram of the divider and multiplier of FIG. 3.

FIG. 8 shows in detail the circuitry of blocks 157 and 158 of FIG. 3. The altitude signal h in analog form is brought into a multiplier 182. Here a plurality of resistors 183 provide the input. These are connected in series with another resistor and are inputs to summing amplifier 187. At each series resistor junction is a line to a block 191 which is essentially a plurality of electronic switches to ground, individually controlled by respective inputs on lines 193.

Resistor 183 and 185 are chosen along with feedback resistor 189 to provide a gain dependent on the state of the switches in block 191. This in effect will permit $h$ to be multiplied by a digital word input on lines 193. Such devices to multiply an analog voltage by a digital word are well known in the art and will not be further described herein. The output of amplifier 187 is summed at point 192 with the output of amplifier 194, which has RVR as an input, through summing resistors 195 and 197. The sum is provided to two comparators 199 and 201. It is provided to the high input of comparator 199 and low input of comparator 201. The other inputs of comparators 199 and 201 are grounded. The multiplied $h$ is an inverted value and RVR an non-inverted value. Thus one will be positive (RVR) and the other negative ($h$). If the multiplied $h$ is less than RVR the resultant voltage will be positive and comparator 210 will have an output which will enable gate 203. Gate 203 has as another input the drive signal through a gate 205 used to invert the drive pulses. Assuming for now that gate 203 is not disabled by an output from gate 207, the pulse will pass through gate 203 to the down count input of a counter 209. The count output will be inverted by an inverter 211 and be provided to block 191 where it will cause h to be multiplied by a greater number and become larger. When the absolute value of the multiplied h reaches that of RVR the voltage at junction 192 will be zero and comparator 201 will switch off, disabling further count pulses. The value output at invert 211 will be RVR/$h$. This must be true since we know $h$ times $(x) = $ RVR or $x =$ RVR/$h$.

If the abolute value of the multiplied $h$ is greater than RVR, comparator 199 will enable gate 213 to cause an up count to be gated to counter 209. When inverted through inverter 211 this will cause the multiplied h to decease until, as before, equality is reached at which time comparator 199 will disable gate 213.

There are established limits of RVR and $h$ in the system and for proper system operation RVR/$h$ is also limited. This is the purpose of gates 207 and 215. When the count in counter 209 is all zeros gate 207 will disable gate 203 preventing a further down count. Likewise when all ones are in the counter the output of inverter 211 will be all zeros and gate 215 will disable gate 213.

The RVR/$h$ output is then provided to a multiplier, comprising switch 217, resistors 219, and 221 and amplifier 223 with its feedback 225, in all respects the same as the $h$ multiplier described above. In this case tha analog input is the modified sweep signal from potentiometer 155 of FIG. 3. The feedback path of amplifier 223 is more complex due to the diode 159, previously described in connection with FIG. 3, on its output. For a negative voltage output feedback is through resistor 227. To avoid a lock-up condition any positive voltages are fed back through diode 229 and resistor 231.

As examples of the types of components that may be used in the circuit the following list is provided:

| | |
|---|---|
| Amplifiers 187, 193 | Fairchild Ma 741 |
| Amplifier 223 | Harris 2605 |
| Comparators 199, 201 | National LM 306 |
| Switches 191, 217 | Texas Inst. SIV 7406 |
| Gates 203, 213 | Motorola MC 862P |
| Gates 207, 215 | Motorola MC 1802 |
| Inverter 211 | Motorola MC 883P |
| Counter 209 | National DM 8563 |

Figure 9:
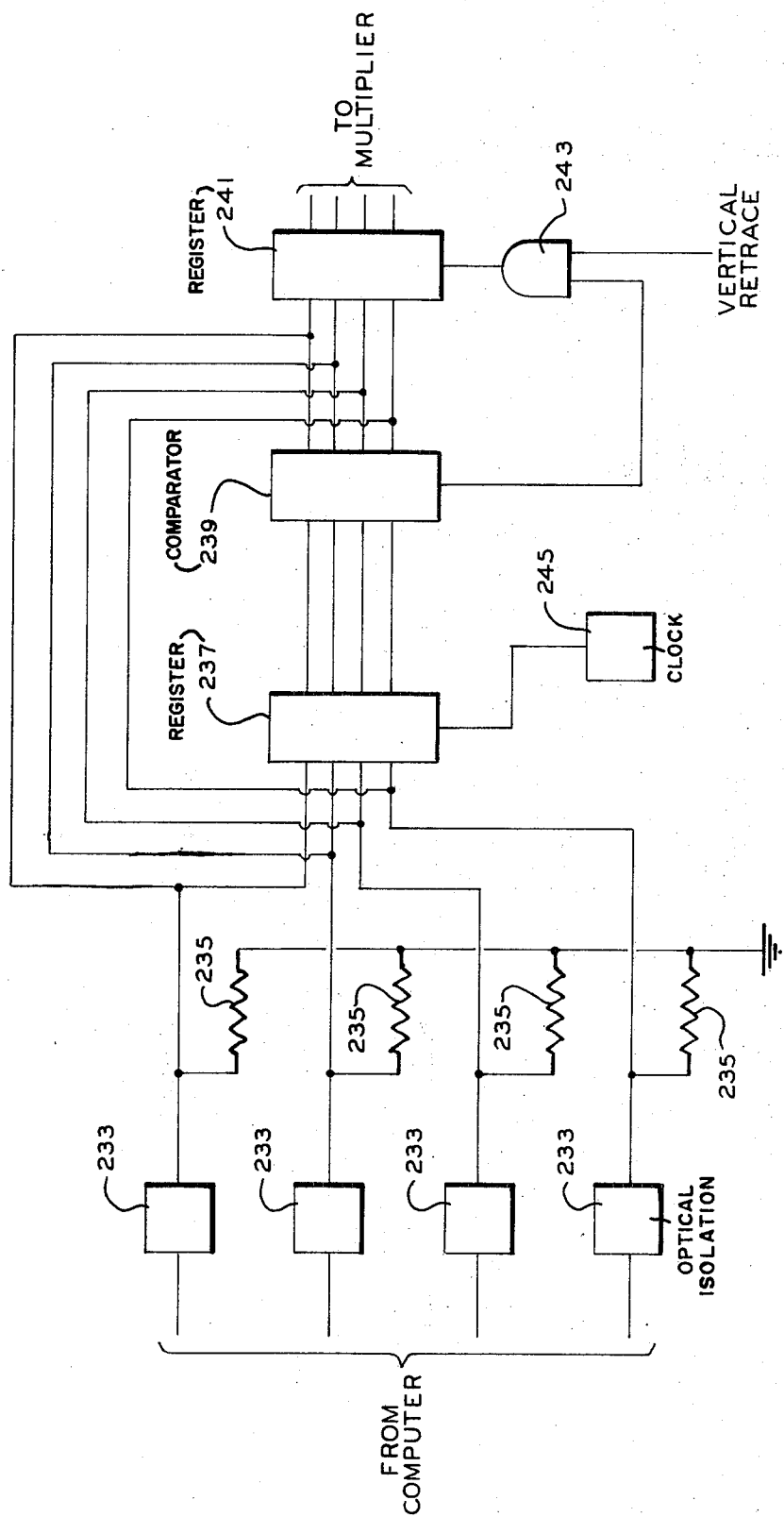
FIG. 9 is a logic diagram of the data buffer of FIG. 3.

As mentioned in connection with FIG. 3 data is provided to buffers 101 and 103 from the computer 21. The update rate of the computer will be in the range of 10 to 20 per second. The television frame rate will be 30 frames/sec (U.S.) or 25 frames per sec (Europe) with field rates double that. Thus the buffers must synchronize these two rates to avoid undesirable effects at the display. In addition, in some systems, absolute electrical isolation between computer 21 and the visual system is required. FIG. 9 shows a data buffer which fills all these needs. Isolation is provided by circuits 233 which have contained therein a device which will emit light when a computer input is obtained and a second device sensitive to that light to provide an output. Thus complete electrical isolation is achieved. A type unit which may be used for circuits 233 is Texas Instruments T 1XL – 112. Only four outputs are shown on FIG. 9 for simplicity. In practice, as many as required for the desired resolution will be provided with operation the same for any number of inputs. The output lines of circuits 233 are all grounded through resistor 235 to make sure the output presents a ground when no signal is present. The outputs are then provided to a register 237, to one side of a comparator 239, and to a second register 241. A high frequency clock 245 gates the output of register 237 to the other side of comparator 239. If the computer is updating data and register 237 is not settled a comparaison will not result. If and when the data at the input and the output of register 237 is the same, indicating a stable condition, comparator 239 will provide an output. It should be noted that this condition means that the data in register 241 is also stable at this time, register 241 being a duplicate of and having the same inputs as register 237.

The comparator output provides an enabling input to And gate 243 (in actual practice 2 Nand gates are used, one providing inversion). The other input to gate 243 is the vertical retrace signal. The output of gate 243 gates out the data in register 241 to the multiplier of FIG. 3. In this way data to the multiplier is only updated during vertical retrace and then only if the data input from the computer is not changing, thus avoiding problems at the display.

Thus a system which generates sky, clouds, and limited visibility scenes both above and below the clouds has been shown. The system may be used not only in camera model visual systems but in any visual system which uses a TV display. Although specific embodiments of the invention have been shown it will be evident to those skilled in the art that various modifications may be made without departing from the spirit of the invention which is intended to be limited solely by the appended claims.

What is claimed is:

1. In a visual display system which provides simulated scenes for a flight simulator having an associated control means wherein voltages representing the simulated pitch and roll of the flight simulator are contained, said simulator further including means to provide a voltage representing simulated visibility range, said visual display system including at least means to generate a terrain video signal of a foreground area, television display means, and sync generating means to drive the scans of the generating means and display means, apparatus to generate a sky scene and to switch between said sky scene and said terrain signal at the simulated horizon said apparatus comprising:
   a. means to generate a cloud video signal which will appear as white on a television screen;
   b. switching means having said terrain video signal as a first input and said cloud video signal as a second input and responsive to a control input to provide said first input as an output when said control input is at a first level, said second input as an output when said control input is at a second level and a proportional mixture of said first and second inputs at levels in between said first and second levels; and
   c. means to detect the location of the simulated horizon and to provide a voltage at said second level when above the horizon and a voltage gradually going from said second to said first level when the horizon is crossed to below said horizon said means comprising:
      1. means having the horizontal and vertical scans, and functions of the pitch and roll of said simulator as inputs and providing as an output a waveform representing resolved scan motion perpendicular to the horizon, said waveform going from a negative to a positive voltage and adapted to cross zero at the horizon point; and
      2. means having said waveform as an input to cause said waveform to be transformed to provide a voltage which goes from said first to said second level each time zero volts is crossed; and
      3. means having as inputs said wave form, the visibility range and altitude to multiply said waveform by the visibility range divided by the altitude and providing said voltage as its output.

2. The invention according to claim 1 wherein said switching means is a gated video amplifier.

3. The invention according to claim 1 and further including means to provide a DC offset to said waveform to insure that zero occurs at the horizon.

4. The invention according to claim 1 and further including means to provide an offsetting input to said waveform means representative of visibility range.

5. The invention according to claim 1 and further including means to control magnitude and thus the brightness of said first and second cloud video signals as a function of the simulated time of day.

6. The invention according to claim 5 wherein said means comprise:
   a. a plurality of adjustable voltage sources one voltage source being provided for each time of day for each of said first and second means;
   b. switching means having said sources as inputs and adapted to switch one of said sources to the inputs of said first and second switching means in response to a control signal; and
   c. means to provide a control signal indicative of the time of day to be simulated.

7. The invention according to claim 1 wherein said means to multiply comprise:
   a. a first multiplying digital-to-analog converter having a voltage representing altitude as its analog input;
   b. a first comparator having its low input grounded and its high input connected through a summing register to the output of said multiplier;
   c. a second comparator having its high input grounded and its low input connected through a summing resistor to a voltage representing visibility range and connected directly to the high input of said first comparator;
   d. an up-down counter;
   e. a first Nand gate having as one input the output of said first comparator and as a second input a train of clock pulses and providing its output to the up input of said counter;
   f. a second Nand gate having as one input the output of said second comparator and as a second input said clock pulses and providing its output to the down input of said counter;
   g. an inverter having the output of said counter as an input and providing its output as the digital input to said first multiplier;
   h. a second multiplying digital-to-analog converter having said waveform as its analog input and said inverter output as its digital input.

8. The invention according to claim 7 and further including:
   a. a third Nand gate having the outputs of said counter as inputs and providing a disabling input to said first gate; and
   b. a forth Nand gate having the outputs as said inverter as inputs and providing a disabling input to said second gate.

9. The invention according to claim 1 wherein said means providing said waveform comprises:
   a. a first multiplier having said horizontal scan as one input and the cosine of pitch times the sine of roll as another input;
   b. a second multiplier having said vertical scan as one input and the cosine of pitch times the cosine of roll as another input; and
   c. a summing amplifier having the outputs of said first and second multipliers as input and providing said waveform as its output.

10. The invention according to claim 9 wherein said flight simulator is driven by a digital computer and said first and second multipliers are multiplying digital-to-analog converters with said cosine pitch times sine roll and cosine pitch times cosine roll provided as digital outputs from said simulator computer.

11. The invention according to claim 10 further including buffers at the digital inputs of each of said first and second multipliers each of said buffers comprising:

a. a first-shift register having its inputs from said digital computer;
b. a comparator having as one set of inputs the outputs of said first register and as a second set of inputs said first register inputs;
c. a second register having as inputs said first register inputs and providing its outputs to one of said multipliers;
d. a high frequency clock providing pulses to gate the inputs of said first register to its outputs;
e. an And gate having the outputs of said comparator as one input and a vertical retrace signal from the sync generator as a second input providng a signal to gate the inputs of said second register to its outputs whereby said output data will change only during vertical retrace and only when said input data is not changing.

* * * * *